Patented Feb. 15, 1944

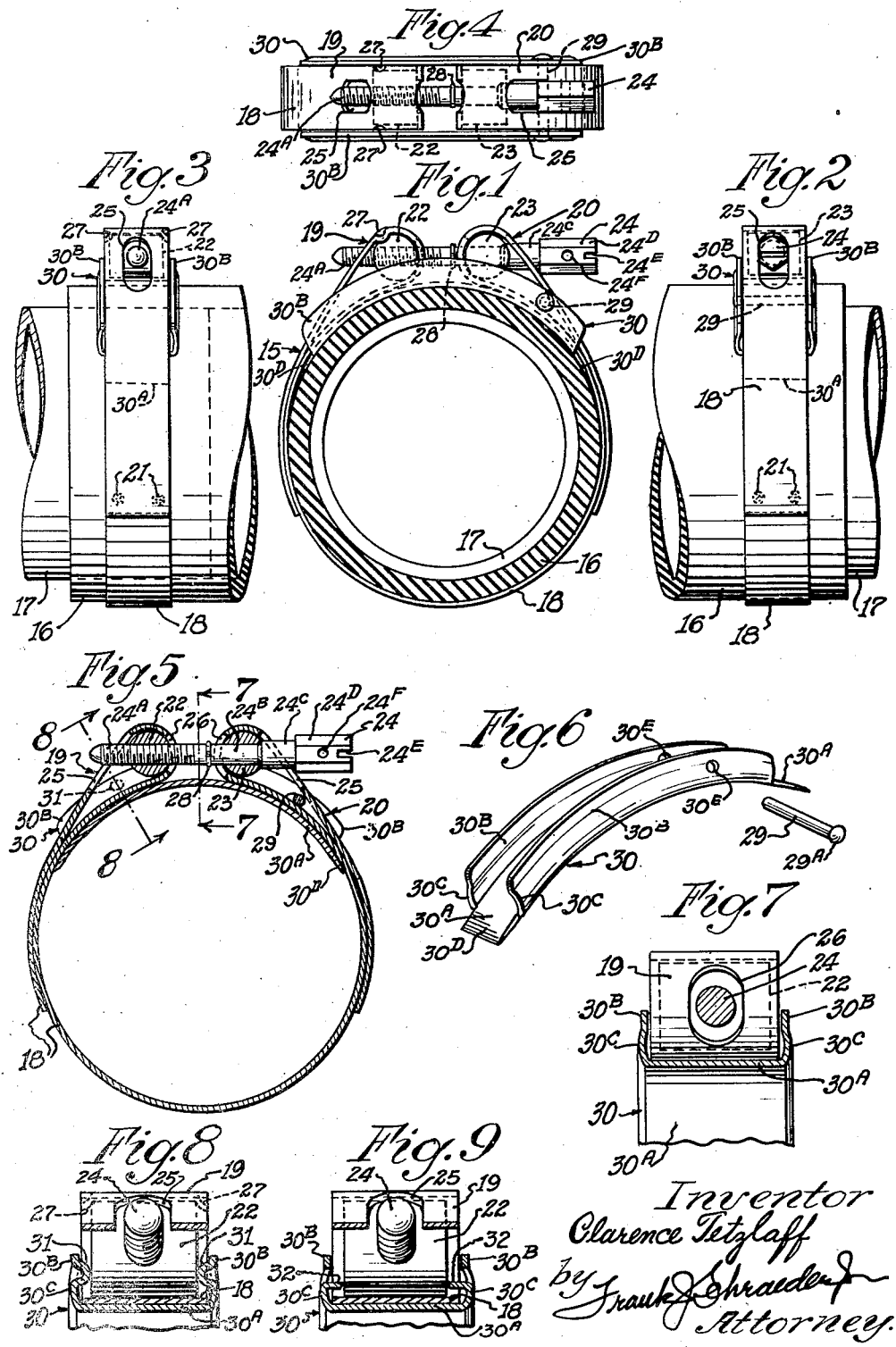

2,341,828

UNITED STATES PATENT OFFICE 2,341,828

CLAMP

Clarence C. Tetzlaff, Berwyn, Ill.

Application July 22, 1942, Serial No. 451,941

3 Claims. (Cl. 24—19)

This invention relates generally to new and useful improvements in clamps of the flexible band type adapted for securing together a pair of telescopically connected members such as, for example, a hose and a tubular connection or pipe.

The invention herein disclosed is directed to improvements in a clamp band tightening device which is employed as an adjustable tightening instrumentality between a pair of looped ends of a flexible clamp band which is adapted to be trained about a cylindrical member, such as, for example, a hose connection in a high pressure pipe line, and which tightening instrumentality is of that type wherein the threaded tightening member or screw is adjustably operatively associated with a pair of spaced relatively movable connectors each pivotally carried in one of the looped ends of the clamp band.

In high pressure hose clamps of the type herein contemplated, it is necessary that the full circumference of the hose connection be tightly embraced by the clamp and therefore the space or gap between the looped ends of the clamp band must be spanned by a suitable bridge which will complete the circumferential engagement of the clamp band about the connection. One of the important objects of my invention is directed to the provision of full circumferential engagement of the hose connection by the clamp band in cooperation with a radially adjustable arcuate bridge.

Another object of my invention resides in the provision of an adjustable "floating" bridge which will not only function to bridge the gap between the looped ends of the clamp band but which bridge will remain in stationary position to provide a metallic base upon which the looped end portions of the clamp band are slidably movable during the tightening of the band.

It is also an important object of my invention to provide a bridge member which is operatively disconnected from the tightening member including means for securely but loosely attaching the proper bridge to its proper companion clamp band. The desirability for attachment of the bridge to the clamp band or tightening member will be hereinafter more fully explained.

With the above and other objects in view, my invention consists in the novel combination, construction and arrangement of the members and parts shown in preferred embodiment in the attached drawing, described in the following specification, and particularly pointed out in the appended claims.

In the drawing:

Fig. 1 is a cross-section through a hose connection showing a side elevation of a clamp embodying my invention;

Fig. 2 is an end view of the clamp;

Fig. 3 is an opposite end view of the clamp;

Fig. 4 is a plan view of the clamp;

Fig. 5 is a vertical section through the clamp;

Fig. 6 is a perspective view of the bridge and the pin for loosely attaching the bridge to the clamp to prevent accidental loss or displacement of the bridge;

Fig. 7 is a cross-section taken on line 7—7 of Fig. 5;

Fig. 8 is cross-section through the clamp taken on line 8—8 of Fig. 5 showing a modified means for loosely attaching the bridge to the clamp to prevent accidental loss or displacement of the bridge. The means illustrated in Fig. 8 being an alternate or substitute for the pin retainer shown in Figs. 1, 2, 4, 5 and 6, hence same is illustrated in Fig. 5 by broken lines whereas the preferred pin retainer shown in cross-section is in full lines and obviously either one of such retaining means may be employed; and Fig. 9 is a cross-section similar to that shown in Fig. 8 but showing still another modified means for loosely attaching the bridge to the clamp.

As shown in the illustrations, the clamp 15 is shown applied to a hose 16 connected to an end of a pipe 17.

The clamp 15 includes a flexible strip of metallic material which constitutes a circular clamp band 18.

The clamp band 18 has end portions which are bent over themselves to form the looped ends 19 and 20 and the termini of these looped portions are preferably spot welded to the medial portion of the band as indicated at 21.

The looped ends 19 and 20 are formed to pivotally embrace within them the cylindrical connector members 22 and 23. When the members 22 and 23 are moved one toward the other to thereby shorten the space or distance between them and the looped ends of the band, the band 18 will be tightened about the hose connection.

The tightening movement of the looped band ends is accomplished by a tightening screw 24 which is arranged to operatively interconnect the two connector members 22 and 23.

To permit the interconnection of the two cylindrical members 22 and 23 by the tightening screw 24, the loops of the band ends are each provided with a pair of transversely aligned elongated slots 25 and 26 and the tightening screw 24 extends through these slots 25 and 26 into operative engagement with the members 22 and 23.

The cylindrical nut member 22 is provided with a transverse female thread to receive therein the threaded end 24$^A$ of the tightening screw 24.

The other member 23 is provided with a transverse cylindrical hole for the cylindrical unthreaded portion 24$^B$ of the shank of the screw 24.

The screw 24 is provided with a shank portion 24$^C$ which is disposed between the shank portion 24$^B$ and the head 24$^D$.

The shank portion 24$^C$ is slightly greater in diameter than the shank portion 24$^B$ and is adapted to abut with the side of the member 23 during the rotations of the screw 24 in tightening or loosening of the clamp band 18.

To provide means for engagement of the head 24$^D$ by suitable clamp-tightening tools, the head 24$^D$ is preferably of hexagon cross-section to afford wrench engagement. To afford engagement of the head 24$^D$ by a screw driver or by a cylindrical pin, the head 24$^D$ is provided respectively with a slot 24$^E$ and a transverse hole 24$^F$.

The opposite edges of the band at the looped end 19 are preferably crimped, as at 27, to prevent displacement of the cylindrical nut 22 from its embracement by looped end 19. This means of retainment of the nut 22 within the looped end 19 prevents displacement of the nut 22 during installation of the clamp.

To prevent displacement of the screw 24 from its assembly, at the manufacturing plant, with the looped end 20, the screw shank is provided with a circular groove which forms a seat for a split steel snap retainer ring 28 of a diameter slightly greater than the width of the slot 26. It will now be apparent that when the screw 24 is assembled with the member 23 its accidental displacement is prevented by the abutment of its shank portion 24$^C$ with one side of the member 23 and the engagement of the retainer ring 28 with the end of the loop 20.

The circularly shaped clamp band 18 and its above-described tightening device would be ineffective as a clamp for securing a hose connection in a high pressure fluid pipe line because of the existing gap between the looped ends 19 and 20 of the clamp, hence a bridge 30 is provided to bridge such gap and to complete the circular engagement of the hose 16 by the clamp.

The bridge 30 is fabricated in arcuate form of a channeled or U-shaped cross-section and it consists of an arcuate base portion 30$^A$ having parallel sides or flanges 30$^B$ formed integrally with the base 30$^A$ to thereby structurally reenforce such bridge so that the required pressure to hold that part of the connection located between the looped band ends may through such structural bridge be effectively transmitted to the base portion 30$^A$ which extends under and between the spaced looped band ends.

The side flanges 30$^B$ insure proper alignment of the bridge with the clamp band and its looped ends 19 and 20 since the inner faces of the marginal edge portions of the side flanges have only a slight clearance with the marginal edges of the looped ends 19 and 20.

The side flange portions 30$^C$ adjacent the base 30$^A$ are preferably of slight arcuate cross-section to strengthen the bridge and to facilitate the bending of same without fracture during manufacture.

The base 30$^A$ of the bridge is preferably extended, at both ends, beyond the ends of the parallel side flanges 30$^B$ and the extended portions 30$^D$ of the base are preferably thinned in cross-section, as by the use of a swage, to thereby maintain a practical continuity in the complete circumferential engagement of the clamp.

The arcuate length of the bridge 30 shall be such that the marginal edges of the extensions 30$^D$ of the bridge base shall extend at least to, and preferably slightly beyond, the points of tangency of the overlapped portions of the looped ends of the band.

Since clamps of the type shown herein are usually made to fit a specific predetermined diameter of hose connection, the bridge 30 is fabricated to properly fit such specific diameter of hose connection. It is therefore important to employ the proper companion bridge in combination with the selected clamp band for a connection of predetermined diameter, hence, one of the important objects of my invention consists in means for securely but loosely attaching such proper bridge to its proper clamp band to thereby prevent its accidental detachment or possible loss, to facilitate shipment of completely assembled clamps, as well as to facilitate the quick mounting of the assembled clamp parts upon the selected connections.

Although one of the important features of my invention resides in the attachment of the bridge 30 to the clamp band to facilitate the mounting of the clamp and to prevent its loss or substitution by a similar bridge but of improper radius, the means for attaching the bridge must be permanent to the extent that such means cannot be accidentally loosened to permit detachment of the bridge but any such means of securement or attachment must also provide the desirable "floating" characteristic to such bridge to thereby afford radial circumferential adjustment or centering of the bridge relatively to the looped ends of the clamp band during the installation of the clamp before actuation of the tightening screw so that the pressures resulting from the drawing together of the looped band ends, upon actuation of the tightening screw, will be properly transmitted to the bridge. Such permissible adjustment of the "floating" bridge to centralized position relatively to the cylindrical members 22 and 23 will also provide a desirable metallic support upon which the looped ends of the band may freely slide during the tightening of the clamp.

In the attached drawing, three different provisions for loosely attaching the bridge to the clamp band are illustrated, however, any one of such provisions will suffice to secure the desired result.

My preferred means of bridge attachment is illustrated in Figs. 1, 2, 4, 5, and 6 and consists in the provision of a pin retainer 29 which extends transversely of the bridge through one of the looped ends of the clamp band. The pin 29 is supported in a pair of transversely aligned openings 30$^E$ in the transversely spaced outstanding sides of the bridge. The pin 29 may be an elongated rivet provided with a head 29$^A$ as shown in Fig. 6. In assembling the bridge 30 with a looped end of the band 18, the pin 29 is inserted to pass through the openings 30ᴱ and within the loop of the band and then rivet-headed at its straight end to prevent its displacement.

It will now be readily apparent that although the bridge is attached to the clamping band, the bridge is circumferentially adjustable for proper centering relatively to the looped ends 19 and 20 through the permissible movement of the bridge-supported pin 29 within the space between the member 23 and the converging band portions of the looped end 20 as clearly evident from Figs. 1 and 5.

Another means of bridge attachment is illustrated in Figs. 5 and 8 and consists in the provision of a pair of inwardly relatively oppositely disposed protrusions 31 formed within the outstanding bridge sides 30ᴮ by a suitable indenting die. The protrusions 31 are disposed in preferably transverse alignment and project inwardly from the bridge sides for limited movement within the space defined by one of the looped band ends. These protrusions 31 may be substituted for the pin 29 to secure the bridge against detachment from the clamp band.

For purposes of more clearly illustrating the location of such protrusions 31, I illustrate one of such protrusions in Fig. 5 in broken lines as provision against detachment of the bridge shown in Fig. 5 is found in the pin 29 shown in cross-section by full lines.

Fig. 9 illustrates still another means of bridge attachment which consists in the provision of a pair of inwardly relatively oppositely bent prongs 32 formed integrally with the bridge sides 30ᴮ by a suitable cutting tool or die. The prongs 32 may be of rectangular shape or of pointed or triangular shape and they are preferably disposed in transverse alignment to project inwardly from the bridge sides for limited movement within the space defined by one of the looped band ends.

The terminal end portions of the band 18 are preferably extended beyond the looped ends 19 and 20 of the band to points beyond the horizontal center-line of the clamp, as indicated in Figs. 1, 2, 3 and 5.

I claim:

1. A hose clamp comprising, in combination, a circular band of flexible material having looped ends embracing a pair of spaced members, a tightening screw rotatably supported on one of said members and having a threaded connection with the other of said members whereby said members are movable toward or from each other to thereby respectively tighten or loosen said band, an arcuate bridge for bridging the space between said looped band ends providing full circular clamping engagement of the clamp about the hose, said bridge having parallel sides formed integrally with a base portion, said base portion supporting the looped portions of said band between said parallel sides, and means loosely connecting said bridge with said band for preventing detachment of said bridge from said band but permitting circumferential adjustment of said bridge relatively to said looped band ends before actuation of said screw to tighten said band.

2. A hose clamp as defined in claim 1 and wherein said loose connection means comprises a pin extending through said parallel bridge sides, transversely to the longitudinal axis of said bridge, and through the loop of one of said band ends.

3. An adjustable bridge for a hose clamp which comprises a flexible circular band having looped ends embracing a pair of spaced members and tightening means connecting said members adapted to cause relative movement of said members to thereby tighten or loosen said band about the hose, said bridge constituting an arcuate member of channeled cross-section consisting of arcuate parallel sides formed integrally with an arcuate base portion, said base portion extending under said looped ends to provide, together with the band, full circular clamping engagement of the clamp about the hose with the looped band ends disposed between said parallel arcuate sides, and a pin extending transversely to the longitudinal axis of the bridge through the loop of one of said band ends and secured to said parallel bridge sides, said bridge being loosely connected by said pin to one end of the clamp band to prevent its detachment therefrom but permitting a circumferential adjustment of the bridge relatively to the looped band ends before actuation of said tightening means to tighten said band.

CLARENCE C. TETZLAFF.